United States Patent
Stöhr et al.

(10) Patent No.: US 11,560,492 B2
(45) Date of Patent: Jan. 24, 2023

(54) COATING SYSTEM HAVING HIGH SURFACE ROUGHNESS

(71) Applicant: SIKA TECHNOLOGY AG, Baar (CH)

(72) Inventors: Benjamin Stöhr, Stuttgart (DE);
Matthias Niethammer, Süssen (DE);
Thomas Pusel, Hemmingen (DE);
Jochen Grötzinger, Schwäbisch Gmünd (DE); Stefan Kühner, Stuttgart (DE)

(73) Assignee: SIKA TECHNOLOGY AG, Baar (CH)

( * ) Notice: Subject to any disclaimer, the term of this patent is extended or adjusted under 35 U.S.C. 154(b) by 575 days.

(21) Appl. No.: 16/630,798

(22) PCT Filed: Jul. 9, 2018

(86) PCT No.: PCT/EP2018/068533
§ 371 (c)(1),
(2) Date: Jan. 13, 2020

(87) PCT Pub. No.: WO2019/011853
PCT Pub. Date: Jan. 17, 2019

(65) Prior Publication Data
US 2020/0165484 A1    May 28, 2020

(30) Foreign Application Priority Data
Jul. 13, 2017  (EP) ..................... 17181247

(51) Int. Cl.
| | | |
|---|---|---|
| C09D 175/04 | (2006.01) | |
| C08K 3/34 | (2006.01) | |
| C08K 3/36 | (2006.01) | |
| C08K 5/21 | (2006.01) | |
| C09D 133/12 | (2006.01) | |
| C09D 163/00 | (2006.01) | |
| C09D 5/04 | (2006.01) | |
| C08K 7/02 | (2006.01) | |

(52) U.S. Cl.
CPC ............ *C09D 175/04* (2013.01); *C08K 3/346* (2013.01); *C08K 3/36* (2013.01); *C08K 5/21* (2013.01); *C09D 5/04* (2013.01); *C09D 133/12* (2013.01); *C09D 163/00* (2013.01); *C08K 7/02* (2013.01); *C08K 2201/005* (2013.01)

(58) Field of Classification Search
CPC ...... C08K 5/21; C08K 3/36; C08K 2201/005; C09D 5/04; C09D 163/00–10; C09D 175/00–16; C09D 133/00–26
See application file for complete search history.

(56) References Cited

U.S. PATENT DOCUMENTS

| | | | | |
|---|---|---|---|---|
| 4,708,978 A | * | 11/1987 | Rodgers | ............... C09D 131/04 524/4 |
| 4,760,103 A | * | 7/1988 | Kraft | .................... C08G 59/182 523/427 |

FOREIGN PATENT DOCUMENTS

| | | | |
|---|---|---|---|
| CN | 103124708 A | | 5/2013 |
| DE | 19919482 C2 | | 4/2001 |
| DE | 10039837 C2 | | 3/2003 |
| DE | 10 2006 012999 A1 | | 9/2007 |
| EP | 2 755 451 A1 | | 7/2014 |
| KR | 20010074609 A | * | 8/2001 |
| WO | 01/96433 A1 | | 12/2001 |
| WO | 2016/151007 A1 | | 9/2016 |

OTHER PUBLICATIONS

Partial machine translation of KR-20010074609-A (2001).*
Aug. 6, 2018 International Search Report issued in International Patent Application No. PCT/EP2018/068533.

* cited by examiner

*Primary Examiner* — Kregg T Brooks
(74) *Attorney, Agent, or Firm* — Oliff PLC

(57) ABSTRACT

A coating system including at least one reactive resin system RH, at least one thixotropic assistant TH selected from the group consisting of urea preparations HZ and fibers FS and at least one inorganic aggregate AZ having a particle size in the range from 0.2 to 3.0 mm. The coating system has a viscosity as measured with a shear rate of 1 s$^{-1}$ of 9000-100,000 Pas and a viscosity as measured with a shear rate of 100 s$^{-1}$ of 400-15,000 Pas. The coating system is notable for high surface roughness and for reliable and long-term bonding of the aggregates to the coating with no need for sealing. There is also no need for the coating to be subsequently strewn with aggregates such as sand, for example.

14 Claims, No Drawings

COATING SYSTEM HAVING HIGH SURFACE ROUGHNESS

TECHNICAL FIELD

The invention relates to floor coating systems featuring sufficient surface roughness, especially for producing industrial floors or carpark floors.

PRIOR ART

For floor covering systems, especially for trafficable floors such as industrial floors, bridges, and floors in carparks, there exists a sometimes diverse profile of requirements, especially in relation to flexibility in conjunction with high abrasion resistance and chemical resistance.

With certain applications, furthermore, sufficient surface roughness is a prerequisite. In order to ensure such roughness, the applied coating system is typically strewn with silica sand or other aggregates before it is cured. After curing has been carried out, the excess/unincorporated silica sand is removed typically with a broom. In order to ensure reliable and long-term bonding of the aggregates, it is additionally necessary thereafter to apply a seal layer of sufficient thickness.

These two additional steps take up not only time but also materials.

SUMMARY OF THE INVENTION

The object of the invention, accordingly, was that of overcoming the above-discussed problems of the prior art, especially in order to provide a floor coating system which ensures sufficient surface roughness, can be produced more quickly, and entails less cost and usage of materials.

Surprisingly it would be possible to achieve this object through the provision of a coating system as claimed in the first main claim.

The object has surprisingly been achieved by means of a coating system as described hereinafter. A feature of this coating system is that the coatings obtained from it on the one hand already comprise aggregates such as sand, for example, meaning that subsequent strewing is not needed. Also not needed are the removal and expensive disposal of the excess/unincorporated silica sand. In the prior art, typically, 8 kg of sand for strewing are used for 2.5 kg of coating, and 4 kg of this sand figure is brushed away again and has to be disposed of. With the coating systems of the invention, in contrast, the consumption of sand is approximately half as great.

Furthermore, the coating system attains sufficient surface roughness, and the coatings obtained ensure reliable and long-term bonding of the aggregates to the coating. The requirement for an additional seal layer of sufficient thickness, in order to ensure reliable and long-term bonding of the aggregates to the coating, is therefore absent.

Preferred embodiments of the composition are reproduced in the dependent claims. The invention is elucidated below comprehensively.

A WAY OF PERFORMING THE INVENTION

The invention relates to a coating system comprising:
at least one reactive resin system RH;
at least one thixotropic assistant TH selected from the group consisting of urea preparations HZ and fibers FS;
at least one inorganic aggregate AZ having a particle size in the range from 0.2 to 3.0 mm;
wherein the coating system 3 min after the mixing of all the components of the coating system apart from the at least one inorganic aggregate AZ has a viscosity as measured at 23° C. using a rheometer with heatable plate (Rheotec MRC300) (0.5 mm gap, measurement plate diameter: 50 mm (plate/plate)) with a shear rate of $1\ s^{-1}$ of 9000-100 000 Pas and a viscosity as measured at a shear rate of $100\ s^{-1}$ of 400-15 000 Pas.

A "diol chain extender" refers to an organic diol which is not a polymer. "Diphenylmethane diisocyanate" or "MDI" for short refers to all isomeric forms of diphenylmethane diisocyanate and any desired mixtures thereof, especially diphenylmethane 4,4'-diisocyanate, diphenylmethane 2,4'-diisocyanate, and diphenylmethane 2,2'-diisocyanate.

A "primary hydroxyl group" refers to an OH group which is bonded to a carbon atom with two hydrogens.

A "primary amino group" refers to an $NH_2$ group which is bonded to an organic radical, and a "secondary amino group" refers to an NH group which is bonded to two organic radicals which may also together be part of a ring.

"Molecular weight" in the present document is understood as the molar mass (in grams per mole) of a molecule. "Average molecular weight" refers to the number average $M_n$ of an oligomeric or polymeric mixture of molecules, which is typically determined using gel permeation chromatography (GPC) against polystyrene as standard.

"Storage-stable" or "storable" refers to a substance or a composition when it can be kept at room temperature in a suitable container for a prolonged time, customarily for at least 3 months up to 6 months or more, without any alteration in its application or service properties as a result of the storage to an extent relevant to its service.

"Room temperature" refers to a temperature of around 23° C.

The coating system comprises at least one thixotropic assistant TH selected from the group consisting of urea preparations HZ and fibers FS.

The urea preparation HZ is preferably a solution of a urea urethane, preferably in the presence of an alkali metal cation, especially of a lithium halide salt, in an aprotic solvent.

The urea urethane is preferably synthesized from a monofunctional C4 to C22 alkyl alcohol or cycloalkyl alcohol, a diisocyanate, and a diamine. The preparation of such urea urethanes is described in the following specifications: DE 19919482 C2, DE 10039837 C2 or DE 10 2006 012999 A.

Suitable aprotic solvents are, for example, N-methylpyrrolidone, N-butylpyrrolidone, N-cyclohexylpyrrolidone, N-ethylpyrrolidone, DMSO, or other aprotic solvents known to the person skilled in the art.

The term "aprotic solvents" in this document is understood in particular to mean nonaqueous solvents which contain no ionizable proton in the molecule.

The alkali metal cations are provided preferably in the form of a halide salt. Preferred salts are sodium, potassium, and lithium halides. It is possible especially to use sodium chloride, sodium iodide, sodium bromide, potassium chloride, potassium iodide, potassium bromide, lithium chloride, lithium iodide, lithium bromide, and combinations thereof. Particularly preferred are lithium halide salts.

One particularly preferred urea preparation is the combination of a lithium halide salt and a reaction product formed by reaction of a monohydroxy compound with a diisocyanate. The initial monoisocyanate adduct is reacted subsequently with a polyamine in the presence of lithium chloride and 1-methyl-2-pyrrolidone, to form a second adduct.

A commercial additive of this kind is sold by BYK Chemie, Wallingford, under the tradename BYK 410. This commercial additive is described by BYK-Chemie as a urea urethane with a small amount of lithium chloride in a 1-methyl-2-pyrrolidone solvent.

The fibers FS comprise or consist preferably of organic, inorganic or synthetic material.

The fibers in question especially are cellulose fibers, cotton fibers, protein fibers, glass fibers or synthetic fibers. Preferred in particular as synthetic fibers are fibers of polyester or of a homopolymer or copolymer of ethylene and/or propylene, or fibers of viscose. These fibers may be short fibers or long fibers, spun, woven or non-woven fibers or filaments. Additionally, the fibers may be oriented or stretched fibers.

The fibers in question are preferably glass fibers, carbon fibers or polymeric fibers. More preferably the fibers consist of a material selected from the group consisting of high-density polyethylene (HDPE), polyethylene terephthalate (PET), polystyrene (PS), polyethylene (PE), polypropylene (PP), polyvinyl chloride (PVC), polyamide (PA), glass, and carbon, and combinations thereof. The fibers in question most preferably are polyethylene fibers or polypropylene fibers.

It may further be advantageous if the fibers consist of an inorganic material, especially of glass.

Preferably the fibers have a fiber length of 0.05 to 1 mm, preferably of 0.1 to 0.5 mm, especially of 0.1 to 0.3 mm, more preferably of 0.1 to <0.3 mm. Preferably the fibers have a fiber diameter of 0.01-50 µm, especially 0.05-20 µm, more preferably 0.05-5 µm, 0.05-1 µm, very preferably 0.05-0.5 µm.

Preferred fibers are available, for example, as Stellmittel T (polyethylene fibers) from Sika Schweiz AG.

The coating system comprises at least one inorganic aggregate AZ having a particle size in the range from 0.2 to 3.0 mm.

Preferably the inorganic aggregate AZ has a particle size in the range from 0.3 to 2.0 mm, preferably in the 0.3 to 1.5 mm range, especially in the range from 0.5 to 1.2 mm.

In this document, the term "particle size" is preferably understood as the "mean particle size". The term "mean particle size" refers here preferably to the D50 value of the cumulative volume distribution curve, at which 50 vol % of the particles have a diameter which is smaller than the value. The mean particle size or the D50 value is determined preferably by laser diffractometry.

The inorganic aggregates preferably have an apparent density of >2.0 kg/dm$^3$. The inorganic aggregates may in particular already be in natural form (fluvial or glacial) or they are processed by mechanical operations, such as intermixing, comminuting, sieving, washing, in industrial plants (mechanical processing).

The inorganic aggregates in question may come from natural deposits, examples being river gravel, moraine gravel, etc., which customarily have an apparent density of 2.2-3 kg/dm$^3$. Also possible, however, are recycled granules from old crushed concrete, with an apparent density of around 2.4 kg/dm$^3$.

Particularly preferred are inorganic aggregates comprising silica sand or corundum, especially comprising silica sand.

Particularly suitable inorganic aggregates have a grading curve in the range from 0.3 to 2.0 mm, preferably in the 0.3 to 1.5 mm range, especially in the range from 0.5 to 1.2 mm.

The grading curve is preferably determined using mesh sieves according to DIN ISO 3310-1.

The fraction of the inorganic aggregate AZ is preferably 40-70 wt %, especially 40-60 wt %, 50-60 wt %, especially preferably 50-55 wt %, based on the total weight of the coating system.

The coating system comprises at least one reactive resin system RH. Synthetic resin layers are formed from cured reactive resins or reactive resin systems, with reactive resin systems referring typically to reactive resins which comprise one or more additives, e.g., fillers and/or solvents. To form the synthetic resin layers, reactive resins are reacted, commonly with the aid of a curing agent, which may also comprise accelerators. The reaction leads to an increase in viscosity and ultimately to the curing of the reactive resin. The result is a synthetic resin, which commonly is a thermoset.

Reactive resin systems of these kinds are available commercially in great diversity. Frequently they are two-component systems, in which one component comprises the reactive resin and the other comprises the curing agent or accelerator. Also in use, furthermore, are systems of 3 or more components—for example, if additionally a cement binder or commonplace or specific filler mixtures are used. One-component systems are also possible. In the case of systems having two, three or more components, the components are mixed with one another and then processed. Through chemical reaction after mixing, the reactive resins cure after a certain time and hence form the layer. For processing, for example, the reactive resins may be given a self-leveling or trowelable formulation.

The reactive resins are selected independently of one another preferably from epoxy resins, polyurethanes, polyureas, mixtures of polyurethanes and polyureas, and poly (meth)acrylates.

More preferably the reactive resins are selected from epoxy resins and polyurethanes, especially polyurethanes.

Reactive resins for producing the synthetic resins preferably do not comprehend reactive resins which comprise fractions of cement, such as cementitious hybrid systems and polymer-enhanced cementitious mixtures. Cement-containing reactive resins of these kinds are available commercially. Cementitious hybrid systems are sold for example by Sika AG—e.g., Sikafloor® EpoCem products, a three-component system which comprises epoxy resin and cement, or Sikafloor® PurCem products, likewise a three-component system comprising polyurethane resin and a cementitious component. Also understood as cement-containing reactive resins are two- and three-component synthetic resins, moreover, such as the Sikafloor® HyCem products, in which one component may consist of synthetic resin dispersions or synthetic resin emulsions.

As and when required, the coating system may comprise one or more additives. By adding additives to the coating system it is possible to modify the properties of the coatings formed from it. Additives can be used, for example, to adjust the viscosity or the color of the coatings.

The additives may already be present in the coating system or may be admixed to the coating system prior to processing.

Examples of possible additives, besides solvents and water, are colorants, such as color quartzes, dyes, pigments, fillers, such as silica sands, ceramic powders, sand, chalk, emulsifiers, film-forming assistants.

Examples that may be given of suitable commercial products with suitability as reactive resin systems include Sikafloor®-264, Sikafloor®-266CR, and Sikafloor®-269CR from Sika AG, which are two-component epoxy resins. Sikafloor®-266CR and Sikafloor®-269CR are solvent-free systems, and so exhibit extremely low TVOC emissions. In addition it is also possible to cite two-component polyurethane coatings from Sika AG, such as Sikafloor®-300N and Sikafloor®-326, for example.

The fraction of the reactive resin system RH is preferably 20-60 wt %, especially 30-60 wt %, especially preferably 40-50 wt %, based on the total weight of the coating system.

Especially preferred reactive resin systems are those which have polyurethanes as a reactive resin.

Particularly preferred is a reactive resin system RH consisting of a first component comprising
   at least one polymer polyol, which is a dispersion of a polymer solid at room temperature in a polyether polyol liquid at room temperature, or at least one polyol P1a having an average molecular weight of 800 to 30 000 g/mol, and
   optionally at least one diol chain extender, and
   optionally further polyols,
and a second component comprising diphenylmethane diisocyanate.

A particularly preferred first component comprises
   at least one polymer polyol which is a dispersion of a polymer solid at room temperature in a polyether polyol liquid at room temperature,
   optionally a diol chain extender,
   optionally further polyols,
wherein the fraction of solid polymer from the polymer polyol, based on the sum total of polymer polyol and optionally further polyols, is in the range from 30 to 100 weight %, especially 50 to 75 weight %.

In this case the polymer polyol, the diol chain extender, and further polyols are present preferably in an amount such that, of the total number of their isocyanate-reactive groups,
   50% to 100%, especially 75% to 95%, come from the polymer polyol and any further polyols present,
   0% to 20%, especially 5% to 10%, come from the diol chain extender.

The ratio of the groups reactive toward isocyanate groups, such as especially hydroxyl groups, primary and secondary amino groups, and aldimino groups, to the isocyanate groups in the composition is suitably in the range from 0.5 to 1.1, preferably in the range from 0.7 to 1.05, very preferably in the range from 0.8 to 1.0, especially about 0.95.

The solid polymer preferably has a mean particle size of at most 5 µm. The mean particle size is more preferably below 2 µm, especially in the range from 0.1 to 1 µm.

Suitable polymer polyols are polyether polyols comprising polymers and/or copolymers of vinylic monomers such as, especially, acrylonitrile, styrene, α-methylstyrene, methyl (meth)acrylate or hydroxyethyl (meth)acrylate, and also polyureas and/or polyhydrazodicarbonamides (PHD) or polyurethanes, wherein the two phases form a stable, storable dispersion and the polymer may be partially grafted to the polyether polyol and/or bonded covalently to the polyether polyol.

Preferred polymer polyols are those for which the solid polymer is a copolymer of acrylonitrile and styrene (SAN) or a polyurea and/or polyhydrazodicarbonamide (PHD) or a polyurethane. The preparability and storage of these polymer polyols are particularly good. Especially preferred is SAN. It is particularly hydrophobic and therefore advantageous in combination with isocyanates.

The polyether polyol of the polymer polyol is preferably a polyoxyalkylene polyol prepared by ring-opening polymerization of oxiranes, especially ethylene oxide and/or 1,2-propylene oxide, with the aid of a starter molecule having two or more active hydrogen atoms, especially water, glycols such as 1,2-ethanediol, 1,2- and 1,3-propanediol, neopentyl glycol, diethylene glycol, triethylene glycol, polyethylene glycols, dipropylene glycol, tripropylene glycol or polypropylene glycols, or triols, especially glycerol or 1,1,1-trimethylolpropane, or sugar alcohols, especially sorbitol (D-glucitol), or diphenols, especially bisphenol A, or amines, especially ammonia, ethylenediamine or aniline, or a mixture thereof.

With particular preference it is a polyoxyalkylene polyol, especially a polyoxypropylene polyol or an ethylene oxide-terminated ("EO-endcapped") polyoxypropylene polyol.

The polyether polyol of the polymer polyol preferably has a molecular weight in the range from 400 to 8000 g/mol, especially 1000 to 6000 g/mol.

The polyether polyol of the polymer polyol preferably has an average OH functionality in the range from 1.75 to 3.5, especially 2.25 to 3.0.

Most preferably the polyether polyol of the polymer polyol is an ethylene oxide-terminated polyoxypropylene triol having a molecular weight in the range from 1000 to 6000 g/mol. A polymer polyol of this kind predominantly possesses primary hydroxyl groups, is relatively hydrophobic, and has an OH functionality of more than 2, and consequently is particularly suitable for combination with isocyanates.

The polymer polyol may consist of any desired combinations of the stated solid polymers and of the stated polyether polyols.

An especially preferred polymer polyol is an ethylene oxide-terminated polyoxypropylene triol having a molecular weight in the range from 1000 to 6000 g/mol, comprising an SAN polymer.

The polymer polyol preferably has a solid polymer content in the range from 10 to 50 weight %.

Preferred as polymer polyol are commercially available products, which are used in particular for producing flexible polyurethane foams, especially the SAN polyols Lupranol® 4003/1, Lupranol® 4006/1/SC10, Lupranol® 4006/1/SC15, Lupranol® 4006/1/SC25, Lupranol® 4010/1/SC10, Lupranol® 4010/1/SC15, Lupranol® 4010/1/SC25, Lupranol® 4010/1/SC30 or Lupranol® 4010/1/SC40 (all from BASF), Desmophen® 5027 GT or Desmophen® 5029 GT (both from Bayer MaterialScience), Voralux® HL106, Voralux® HL108, Voralux® HL109, Voralux® HL120, Voralux® HL400, Voralux® HN360, Voralux® HN370, Voralux® HN380 or Specflex® NC 700 (all from Dow), Caradol® SP27-25, Caradol® SP30-15, Caradol® SP30-45, Caradol® SP37-25, Caradol® SP42-15, Caradol® SP44-10 or Caradol® MD22-40 (all from Shell), and also the PHD polyol Desmophen® 5028 GT (from Bayer MaterialScience).

Particularly preferred of these are the SAN polyols, especially the stated commercially available products.

The first component of the reactive resin system preferably further comprises at least one diol chain extender. The diol chain extender is preferably an aliphatic or cycloaliphatic diol having a molecular weight in the range from 60 to 200 g/mol.

Preferably the diol chain extender contains at least one primary hydroxyl group.

The reactive resin system preferably comprises at least one further polyol which is a polyether polyol or a poly(meth)acrylate polyol or a polyhydroxy-functional fat or oil.

A further particularly preferred first component comprises
   at least one polyol P1a having an average molecular weight of 800 to 30 000 g/mol, optionally a diol chain extender,
optionally further polyols,
wherein the fraction of polyol P1a based on the sum of polyol P1a and any further polyols is in the range from 70 to 100 weight %.

In this case the polyol P1a, the diol chain extender, and further polyols are present preferably in an amount such that, of the total number of their isocyanate-reactive groups,
50% to 100%, especially 75% to 95%, come from the polyol P1a and any further polyols present,
0% to 10%, especially 0% to 5%, come from the diol chain extender.

Examples of suitable polyols P1a are polyoxyalkylene polyols, also referred to as "polyether polyols", polyester polyols, polycarbonate polyols, poly(meth)acrylate polyols, polyhydrocarbon polyols, polyhydroxy-functional acrylonitrile/butadiene copolymers, and mixtures thereof, especially the diols thereof and mixtures of these.

Examples of polyether polyols are polyoxyethylene polyols, polyoxypropylene polyols, and polyoxybutylene polyols, especially polyoxyethylene diols, polyoxypropylene diols, polyoxybutylene diols, polyoxyethylene triols, and polyoxypropylene triols. Polyoxyalkylene diols or polyoxyalkylene triols having a degree of unsaturation of less than 0.02 meq/g and an average molecular weight in the range from 1000 to 30 000 g/mol, and polyoxyethylene diols, polyoxyethylene triols, polyoxypropylene diols, and polyoxypropylene triols having an average molecular weight of 800 to 8000 g/mol are suitable.

Further examples of polyether polyols are so-called ethylene oxide-terminated ("EO-endcapped", ethylene oxide-endcapped) polyoxypropylene polyols, styrene-acrylonitrile-grafted polyether polyols, e.g., Lupranol® from Elastogran GmbH, Germany.

Particularly preferred polyols P1a are polyhydroxy-functional natural fats and/or oils, such as castor oil, or polyols obtained by chemical modification of natural fats and/or oils. Castor oil is particularly preferred.

The ratio of the groups that are reactive toward isocyanate groups, such as especially hydroxyl groups, primary and secondary amino groups, and aldimino groups, to the isocyanate groups in the composition is suitably in the range from 0.5 to 1.1, preferably in the range from 0.7 to 1.05, more preferably in the range from 0.8 to 1.0, especially about 0.95.

The second component of the reactive resin system comprises diphenylmethane diisocyanate (MDI). Preferred as MDI are diphenylmethane 4,4'-diisocyanate (4,4'-MDI), diphenylmethane 2,4'-diisocyanate (2,4'-MDI) and/or diphenylmethane 2,2'-diisocyanate (2,2'-MDI). Particularly preferred is 4,4'-MDI. Particularly high strengths are obtained with it.

The second component preferably has a monomeric diphenylmethane diisocyanate content in the range from 20 to 100 weight %, more preferably 40 to 100 weight %, especially 60 to 100 weight %.

The coating system 3 min after the mixing of all the components of the coating system apart from the at least one inorganic aggregate AZ has a viscosity at a shear rate of 1 $s^{-1}$ of 9000-100 000 Pas and a viscosity as measured at a shear rate of 100 $s^{-1}$ of 400-15 000 Pas.

The viscosities stated above at the different shear rates are measured at 23° C. using a rheometer with heatable plate (Rheotec MRC300) (0.5 mm gap, measurement plate diameter: 50 mm (plate/plate)).

The reason for determining the aforesaid viscosities in the absence of the at least one inorganic aggregate AZ is that determining the viscosity of the coating system including the inorganic aggregate AZ would result in damage to the measuring apparatus.

Preferably the coating system 3 min after mixing of all the components of the coating system except for the at least one inorganic aggregate AZ has a viscosity at a shear rate of 1 s−1 of 10 000-80 000 Pas, 15 000-80 000 Pas, 20 000-80 000 Pas, 25 000-80 000 Pas; and has
a viscosity as measured at a shear rate of 100 s−1 of 400-12 000 Pas, 1000-10 000 Pas, 1000-8000 Pas, 1000-6500 Pas, more preferably 2000-6500 Pas.

Surprisingly it has been found that compositions which have both viscosities (shear rate of 1 s−1 and shear rate of 100 s−1) in the aforesaid ranges result in a high surface roughness at the same time as assured processing qualities. Additionally, high viscosity values at a shear rate of 100 s−1 are conducive to good processing qualities.

It is advantageous, additionally, if the coating system at 23° C. 3 min-10 min, 3 min-20 min, especially 3 min-30 min, more preferably 3 min-60 min, after the mixing of all the components of the coating system except for the at least one inorganic aggregate AZ has an above-stated viscosity (shear rate of 1 s−1 and shear rate of 100 s−1).

The curing reaction commences with the mixing of the coating system. The reactive resins are reacted commonly with the aid of a curing agent, which may also comprise accelerators. The reaction leads to an increase in viscosity and eventually to the curing of the reactive resin, thereby ultimately curing the coating system.

The present invention accordingly also describes a cured composition obtained from an aforementioned coating system after the mixing of the components and their curing.

In a further aspect, the invention also relates to the use of an above-described coating system as a coating.

Suitable substrates for the coating, especially the floor coating and preferably, in particular, industrial-floor, bridge, and parking-deck coating, are in principle all substrates which are present in edifices. Examples of suitable substrates are concrete, cement screed, magnesia screed, ceramic tiles, asphalt, and any existing synthetic resin coatings.

This use may preferably involve use in a floor coating system, comprising
optionally a primer and/or an undercoat and/or a repair compound or leveling compound,
at least one layer of the above-described coating system,
optionally a seal.

To produce the coating of the invention, preferably a primer and/or an undercoat and/or a repair or leveling compound is applied to the substrate, optionally after customary substrate pretreatment, such as grinding, sandblasting, shot blasting or caustic treatment with solvents or acids, for example. Preference is given to applying an undercoat. For the undercoat, a typical undercoating composition is applied—for example, a reactive resin or reactive resin compound or else alternatively a synthetic resin dispersion which is water-based—and cured. The undercoat is preferably a synthetic resin undercoat based on cured reactive resins.

For application, the freshly mixed coating system with the viscosity according to the invention is applied as a layer to a planar or slightly inclined substrate, typically by being poured onto the substrate, especially the primer and/or undercoat and/or repair or leveling compound, and then spread flatly to the desired layer thickness, using a roller, a spreader, a notched trowel or a spatula, for example.

Application takes place preferably within the open time of the coating system. The "open time" or else "pot life" here refers to the time elapsing between the mixing of the components and the end of a state of the composition in which it is suitable for working. A typical measure of the end of the pot life may be a doubling of the aforementioned viscosities according to the invention (shear rate of 1 s−1 and shear rate of 100 s−1).

After the coating system has been applied, it is worked on preferably with a roll, especially a structured roll. A structured roll of this kind preferably has a roll width of 10-80 cm, especially 15-40 cm, and a roll diameter of 4-20 mm, especially 6-10 mm.

This working, especially rolling, using a roll, especially a structured roll, is preferably accomplished within the open time of the coating system. The working preferably takes place immediately after application of the coating system, preferably 5-20 min after application of the coating system. It is preferred, in addition, if the working takes place within the period in which the coating system has the viscosities according to the invention (shear rate of 1 s−1 and shear rate of 100 s−1).

The roll preferably consists of plastic, more particularly of a plastic foam, more particularly an open-pore foam made of plastic. One commercially available structured roll is available, for example, as Rollo-Schaum, coarse structured roll (roll width 25 cm, roll diameter 80 mm) from Friess-Techno-Profi GmbH, Germany.

Preferably a layer thickness in the range from 1.5 to 6 mm, 3 to 5 mm, especially 3 to 4.5 mm, is applied in one operation.

The coating system described is preferably applied as one layer.

With preference no further aggregates are applied to/strewn into the coating system layer described, such as, for example, sand, gravel or other aforesaid aggregates, after the application of the layer of the coating system.

One or more topcoats may be applied to the described layer of the coating system. As the uppermost or final layer, a seal is preferably applied.

It may on the one hand be advantageous if no further layers are applied to the described coating system layer. As a result of the lack of a need for an additional topcoat to ensure sufficient bonding of the inorganic aggregates AZ to the cured reactive resin system RH of the coating system, floor coatings can be produced more quickly and cost-effectively.

On the other hand, however, it may also be advantageous if further layers are applied to the described layer of the coating system. More preferably only one additional layer, especially a seal, is applied.

A "seal" in this context refers to a transparent or pigmented, high-grade coating which is applied as the uppermost, thin layer to a coating. It protects and enhances the surface of the coating.

A typical layer thickness in this case, in the dry state, is in the range from 0.03 to 1 mm, especially 0.03 to 0.3 mm, more preferably 0.1 to 0.2 mm (around 150 g/m$^2$).

This seal layer thickness is lower than for typical seals in the prior art, which are intended additionally to ensure the fixing of the subsequently strewn-in aggregates and which typically have a layer thickness of 0.5-1.5 mm (more than 700 g/m$^2$).

This lower layer thickness is an advantage in the sense that:
costs are reduced as a result of a lower level of material consumption requirements in terms of the mechanical properties of the seal are lower, since it is not required to contribute to mechanical resistance.

The seal affords additional protection from UV light, oxidation or microbial infestation, offers esthetic design opportunities, and prevents soiling.

Particular preference is given to use in a floor coating system selected from the group consisting of floor coating systems for balconies, patios, squares, industrial floors, bridges, and parking decks, especially industrial floors, bridges, and parking decks, very preferably parking decks.

A further advantage of the present invention is that in the case of the strewn systems in the prior art, the sand applied must first be "wetted" with the sealing material. In that case, firstly, part of the sealing material is absorbed by the sand, and, additionally, this wetting time means that this step of work is additionally prolonged. The "wetting" and also the associated loss of material disappear with the present invention.

It has additionally been found, surprisingly, that the application of the same amount of sealing material to a coating system of the present invention has been able to be made with less force applied, in the spreading of the sealing material, than to a sanded-off system of the prior art.

In a further aspect the invention also relates to a method for producing a coating with an above-described coating system, wherein the method comprises the following method steps:
 a) mixing reactive resin system RH, thixotropic assistant TH, and inorganic aggregates AZ as described above to give an above-described coating system,
 b) applying the resulting coating system to a substrate,
 c) preferably machining the applied coating system, and
 d) curing the applied coating system.

The substrates mentioned are preferably a substrate as described above.

Additionally, in this method, preference is given to the production of coatings of the kind described above as preferred floor coatings.

The mixing of reactive resin system RH, thixotropic assistant TH, and inorganic aggregates AZ takes place preferably:
 at temperatures in the range from 5 to 40° C.;
 within 1-10 min, especially within 2-6 min.

The coating system obtained is applied preferably as described above for the use of the coating system, especially in relation to a possible substrate pretreatment, the application of the coating system, working on the applied coating system using a roller, especially structured roller, and also layer thickness. The embodiments specified above in this context as being preferred are also preferred for the method.

It is especially preferred if after step c) no further aggregates are applied to/scattered into the described coating system layer, such as, for example, sand, gravel or other aforementioned aggregates, after the application of the coating system.

After step d) it may be advantageous to apply no further layers, as stated above as being preferred when using the coating system.

Preferably, however, after step d), a further layer is to be applied, more particularly a seal, as stated above as being preferred when using the coating system.

EXAMPLES

Given below are working examples which are intended to further elucidate the invention described. Of course, the invention is not confined to these working examples described.

Commercial Substances Used:

Sikafloor®-161 Two-component epoxy resin coating, Sika AG

Sikafloor®-32 Pronto Three-component polymethyl methacrylate coating, Sika AG

Sikafloor®-377 Two-component polyurethane coating, Sika AG

Stellmittel T Stellmittel T, thixotropic agent, polyethylene fibers, fiber length: <0.3 mm, fiber thickness: around 0.1 μm, Sika AG BYK 410 Bentone Urea urethane with a small amount of lithium chloride in a 1-methyl-2-pyrrolidone solvent, BYK Chemie BENTONE SD-2, organic derivative of bentonite, Elementis Specialties Silica sand Grading curve=0.6-1.2 mm, particle size=0.6-1.2 mm, Gebrüder Dorfner GmbH & Co., Germany Production and Application of the Mixed Coating Systems, and Methods of Testing:

The components of the relevant reactive resin system (reactive resin system RH and thixotropic assistant TH) are mixed with a paddle stirrer in the stated mixing ratio and after thorough mixing (around 1 minute) the thixotropic assistant TH is added continuously in accordance with the quantities specified in Table 1, and mixing continues for around 1 minute.

Immediately thereafter the silica sand was added, in an amount of 125 wt %, based on the total weight of the sum total of mixed reactive resin system and added thixotropic assistant TH. Mixing was continued for one minute.

Without delay, the viscosities of the mixed compositions Z1-Z12 (before the addition of the silica sand) and their slump were tested, and respectively these compositions were applied as follows:

The sample plates (30 cm×100 cm) were primed (400-600 g/m$^2$) with Sikafloor-161. Thereafter the mixed compositions Z1-Z12 were poured out on the sample plate and spread over the area with a smoothing trowel. After a waiting time of around 2 minutes, a perforated foam roll (Rollo-Schaum, coarse structured roll (roll width 25 cm, roll diameter 80 mm) from Friess-Techno-Profi Gmbh, Germany) was rolled over the area. The layer thickness was around 3 mm.

The viscosity was measured at 23° C. using a rheometer with a heatable plate (Rheotec MRC300) (0.5 mm gap, measurement plate diameter: 50 mm (plate/plate)).

The slump was determined in accordance with EN-12350-5 using a flow table at 23° C. Immediately after the mixing of the components, 500 ml of the respective mixture was introduced up to the upper edge of the cone, and poured out on a glass plate. The sample was thereafter spread on the flow table with 15 jolts. The mean diameter of the spread composition was measured after 5 minutes.

The surface roughness is determined by the user, who compares the surface roughnesses obtained with values from the prior art. Serving as the reference is a system which, as known in the prior art, has been sanded off with silica sand. A system of this kind was accorded the value of "rough".

The processing qualities are determined by the user during application. Critical here is the resistance with which the coating can be spread. The aim of application is to be able to apply a layer 3 mm thick with appropriate force and in an appropriate time using a notched coater. The self-leveling coating systems that are on the market, and their application properties, serve as a reference. A reference system of this kind was accorded the value of "+"=good. The value "○" denotes "adequate", and "-" denotes "unsatisfactory".

Surprisingly it was found that only urea preparations and fibers within the viscosities according to the invention lead to high surface roughness in conjunction with assured processing qualities. The use of bentones, in contrast, does not lead to such characteristics.

TABLE 1

| Reactive resin | Experiment | Thixotropic assistant (wt % based on total coating system weight) | D = 1 s−1 | D = 5 s−1 | D = 10 s−1 | D = 100 s−1 | Slump | Surface roughness | Processing qualities |
| --- | --- | --- | --- | --- | --- | --- | --- | --- | --- |
| SR-161 | Z1 | — | 2100 | 1340 | 1200 | 1050 | n.d. | smooth | + |
| SR-161 | Z2 | 2 wt % Stellmittel T | 32 600 | 13 900 | 10 300 | 4220 | 189 mm | very rough | + |
| SR-32 | Z3 | — | 1110 | 621 | 546 | 468 | n.d. | smooth | + |
| SR-32 | Z4 | 3 wt % Stellmittel T | 16 300 | 6070 | 4530 | 1980 | 191 mm | very rough | + |
| SR-377 | Z5 | — | 2550 | 2590 | 2710 | 2900 | n.d. | smooth | + |
| SR-377 | Z6 | 0.1 wt % BYK 410 | 2710 | 2640 | 2730 | 2830 | n.d. | smooth | + |
| SR-377 | Z7 | 1 wt % BYK 410 | 8270 | 4690 | 4090 | 3230 | n.d. | very slight roughness | + |
| SR-377 | Z8 | 5 wt % BYK 410 | 69 300 | 23 200 | 16 000 | 6810 | 195 mm | rough | ○ |
| SR-377 | Z9 | 0.5 wt % Stellmittel T | 5040 | 4760 | 4790 | 4490 | n.d. | smooth | + |
| SR-377 | Z10 | 1 wt % Stellmittel T | 8330 | 7000 | 6470 | 5300 | n.d. | very slight roughness | + |
| SR-377 | Z11 | 2 wt % Stellmittel T | 27 800 | 15 800 | 13 300 | 8150 | 200 mm | rough | ○ |
| SR-377 | Z12 | 5 wt % Bentone | 16 400 | 15 500 | 16 600 | 17 700 | n.d. | smooth | − | n.d. = not determined

The invention claimed is:

1. A coating system comprising:
   at least one reactive resin system RH;
   at least one thixotropic assistant TH selected from the group consisting of urea preparations HZ and fibers FS;
   at least one inorganic aggregate AZ having a particle size in the range from 0.2 to 3.0 mm;
   wherein the coating system 3 min after the mixing of all the components of the coating system apart from the at least one inorganic aggregate AZ has a viscosity as measured at 23° C. using a rheometer with heatable plate (Rheotec MRC300) (0.5 mm gap, measurement plate diameter: 50 mm (plate/plate)) with a shear rate of 1 s-1 of 9000-100,000 Pas and a viscosity as measured at a shear rate of 100 s-1 of 400-15,000 Pas.

2. The coating system as claimed in claim 1, wherein the inorganic aggregate AZ has a grading curve in the range from 0.3 to 2.0 mm.

3. The coating system as claimed in claim 1, wherein the inorganic aggregate AZ has a particle size in the range from 0.3 to 2.0 mm.

4. The coating system as claimed in claim 1, wherein the fibers FS are glass fibers, carbon fibers or polymeric fibers.

5. The coating system as claimed in claim 1, wherein the urea preparation HZ is a solution of a urea urethane, in an aprotic solvent.

6. The coating system as claimed in claim 5, wherein the urea urethane is synthesized from a monofunctional C4 to C22 alkyl alcohol or cycloalkyl alcohol, a diisocyanate, and a diamine.

7. The coating system as claimed in claim 1, wherein the coating system has a viscosity as measured at 23° C. using a rheometer with heatable plate (Rheotec MRC300) (0.5 mm gap, measurement plate diameter: 50 mm (plate/plate)) with a shear rate of 1 s-1 of 10,000-80,000 Pas, and a viscosity as measured at 23° C. using a rheometer with heatable plate (Rheotec MRC300) (0.5 mm gap, measurement plate diameter:
   50 mm (plate/plate)) with a shear rate of 100 s-1 of 400-12,000 Pas.

8. The coating system as claimed in claim 1, wherein the reactive resin of the reactive resin system RH is selected from the group consisting of epoxy resins, polyurethanes, polyureas, mixtures of polyurethanes and polyureas, polymethacrylates, and polyacrylates.

9. The coating system as claimed in claim 8, wherein the reactive resin of the reactive resin system RH is selected from the group consisting of epoxy resins and polyurethanes.

10. A cured composition obtained from a coating system as claimed in claim 1, after the mixing of the components and their curing.

11. The use of A coating formed from a coating system as claimed in claim 1.

12. A floor coating system, comprising
    optionally a primer and/or an undercoat and/or a repair compound or leveling compound,
    at least one layer of the coating system described in claim 1,
    optionally a seal.

13. The floor coating system as claimed in claim 12, applied to an industrial floor, a bridge, or a parking deck.

14. A method for producing a coating with a coating system as claimed in claim 1, the method comprising the following method steps:
    a) mixing reactive resin system RH, thixotropic assistant TH, and inorganic aggregates AZ as in claim 1 to give a coating system as claimed in claim 1,
    b) applying the resulting coating system to a substrate,
    c) machining the applied coating system, and
    d) curing the applied coating system.

* * * * *